(12) United States Patent
Trigonakis et al.

(10) Patent No.: US 12,197,436 B2
(45) Date of Patent: Jan. 14, 2025

(54) SUBQUERIES IN DISTRIBUTED ASYNCHRONOUS GRAPH QUERIES

(71) Applicant: Oracle International Corporation, Redwood Shores, CA (US)

(72) Inventors: Vasileios Trigonakis, Zurich (CH); Anton Ragot, Switzerland (CH); Yahya Ez-zainabi, Berrechid (MA); Tomas Faltin, Prague (CZ); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 95 days.

(21) Appl. No.: 18/091,242

(22) Filed: Dec. 29, 2022

(65) Prior Publication Data

US 2024/0220495 A1    Jul. 4, 2024

(51) Int. Cl.
*G06F 16/2453*    (2019.01)
*G06F 16/901*    (2019.01)

(52) U.S. Cl.
CPC .. *G06F 16/24535* (2019.01); *G06F 16/24537* (2019.01); *G06F 16/9024* (2019.01)

(58) Field of Classification Search
None
See application file for complete search history.

(56) References Cited

U.S. PATENT DOCUMENTS

| 11,243,949 | B2 * | 2/2022 | Kreutzer | G06F 16/9024 |
| 11,321,330 | B1 * | 5/2022 | Pandis | G06F 16/2471 |
| 2016/0103931 | A1 | 4/2016 | Appavu | |
| 2016/0179883 | A1 | 6/2016 | Chen | |
| 2017/0046388 | A1 | 2/2017 | Kirk et al. | |
| 2018/0067987 | A1 | 3/2018 | Kang et al. | |
| 2018/0218088 | A1 | 8/2018 | Fischer et al. | |
| 2019/0005044 | A1 * | 1/2019 | Bell | G06F 16/353 |
| 2019/0213356 | A1 | 7/2019 | Vagujhelyi et al. | |
| 2021/0240705 | A1 | 8/2021 | Trigonakis | |

(Continued)

OTHER PUBLICATIONS

Zemke, Fred, "Fixed Graph Patterns", ISO/IEC SC32/WG3:ERF-035, dated Sep. 14, 2018, 25 pages.

(Continued)

*Primary Examiner* — Giuseppi Giuliani
(74) *Attorney, Agent, or Firm* — Hickman Becker Bingham Ledesma LLP; Stephen R. Tkacs

(57) ABSTRACT

A graph processing engine is provided for executing a graph query comprising a parent query and a subquery nested within the parent query. The subquery uses a reference to one or more correlated variables from the parent query. Executing the graph query comprises initiating execution of the parent query, pausing the execution of the parent query responsive to the parent query matching the one or more correlated variables in an intermediate result set, generating a subquery identifier for each match of the one or more correlated variables, modifying the subquery to include a subquery aggregate function and a clause to group results by subquery identifier, executing the modified subquery using the intermediate result set and collecting subquery results into a subquery results table responsive to pausing execution of the parent query, and resuming execution of the parent query using the subquery results table.

20 Claims, 9 Drawing Sheets

(56) References Cited

U.S. PATENT DOCUMENTS

2022/0129451 A1    4/2022  Haprian et al.
2022/0414100 A1*  12/2022  Carter ................ G06F 16/2471

OTHER PUBLICATIONS

TigerGraph, "The Only Scalable Graph Database for the Enterprise", https://www.tigergraph.com/, last viewed on Nov. 4, 2020, 9 pages.

PGQL, "Property Graph Query Language", http://pgql-lang.org/, last viewed on Nov. 3, 2020, 5 pages.

Neo4j Graph Platform, "What is Neo4j?", https://neo4j.com/, last viewed on Nov. 4, 2020, 14 pages.

Neo4j Graph Database Platform, "Cypher Query Language", https://neo4j.com/developer/cypher/, dated Nov. 4, 2020, 7 pages.

Michaels, Jan, "Property Graph Data Model—The Proposal", Individual Expert Contribution, dated Jan. 16, 2019, 76 pages.

Databricks, "Graph Analysis Tutorial with GraphFrames", dated Jul. 21, 2020, https://docs.databricks.com/spark/latest/graph-analysis/graphframes/graph-analysis-tutorial.html, 2 pages.

Apache TinkerPop, "The Gremlin Graph Traversal Machine and Language", tinkerpop.apache.org/gremlin.html, last viewed on Nov. 4, 2020, 6 pages.

Amazon Neptune, "Overview" https://aws.amazon.com/neptune/, last viewed on Nov. 4, 2020, 20 pages.

Haprian, U.S. Appl. No. 17/080,698, filed Oct. 26, 2020, Notice of Allowance and Fees Due, Dec. 28, 2022.

Haprian, U.S. Appl. No. 17/080,698, filed Oct. 26, 2020, Notice of Allowance and Fees Due, Sep. 14, 2022.

Haprian, U.S. Appl. No. 17/080,698, filed Oct. 26, 2020, Non-Final Rejection, Dec. 24, 2021.

Haprian, U.S. Appl. No. 17/080,698, filed Oct. 26, 2020, Final Rejection, May 18, 2022.

* cited by examiner

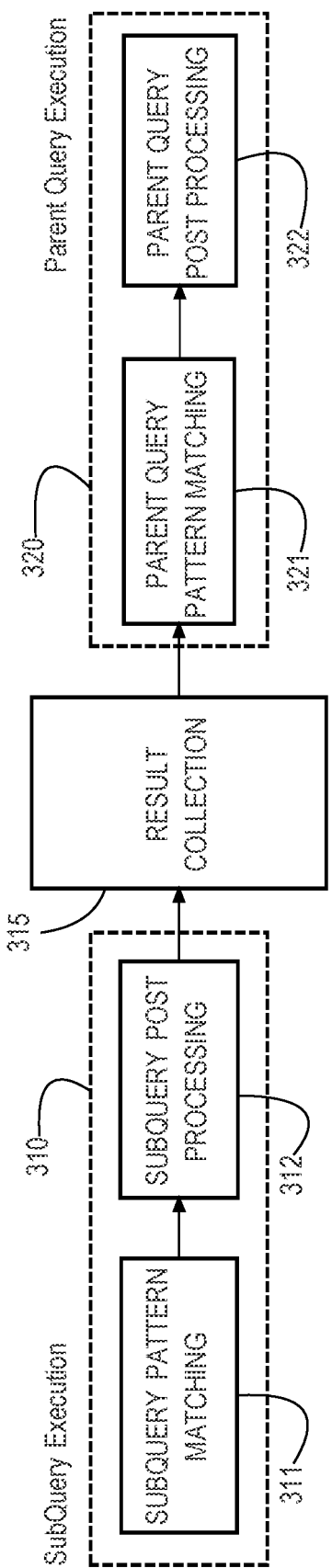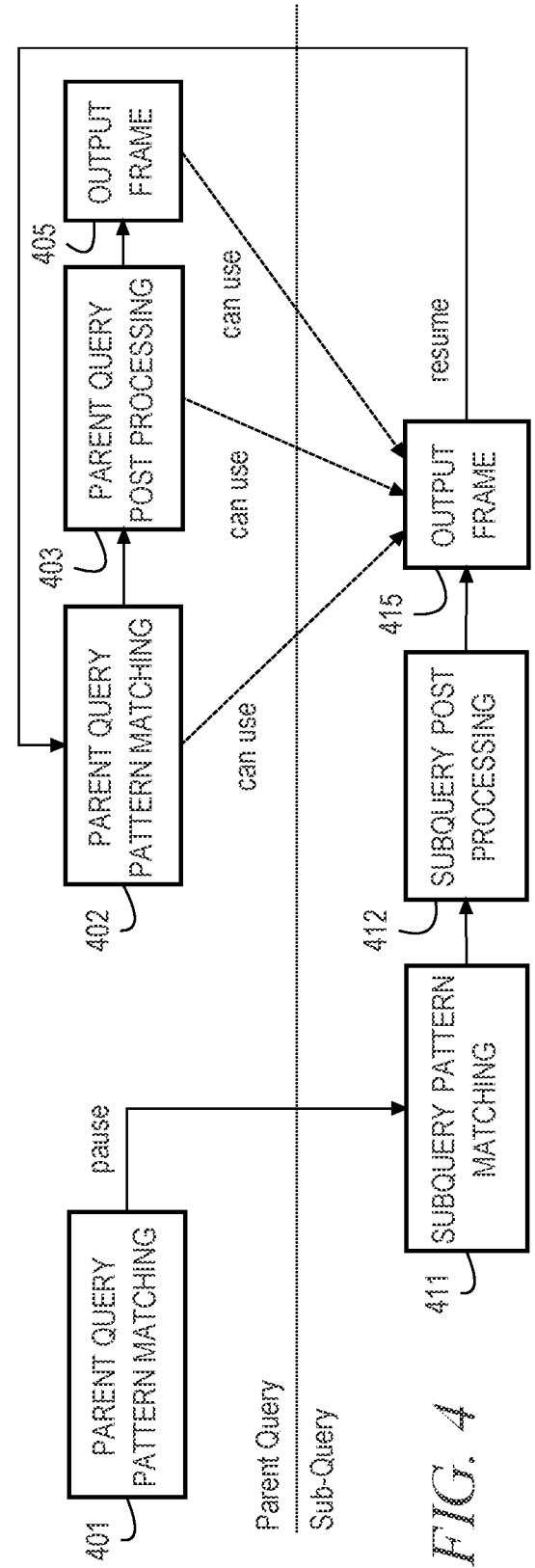

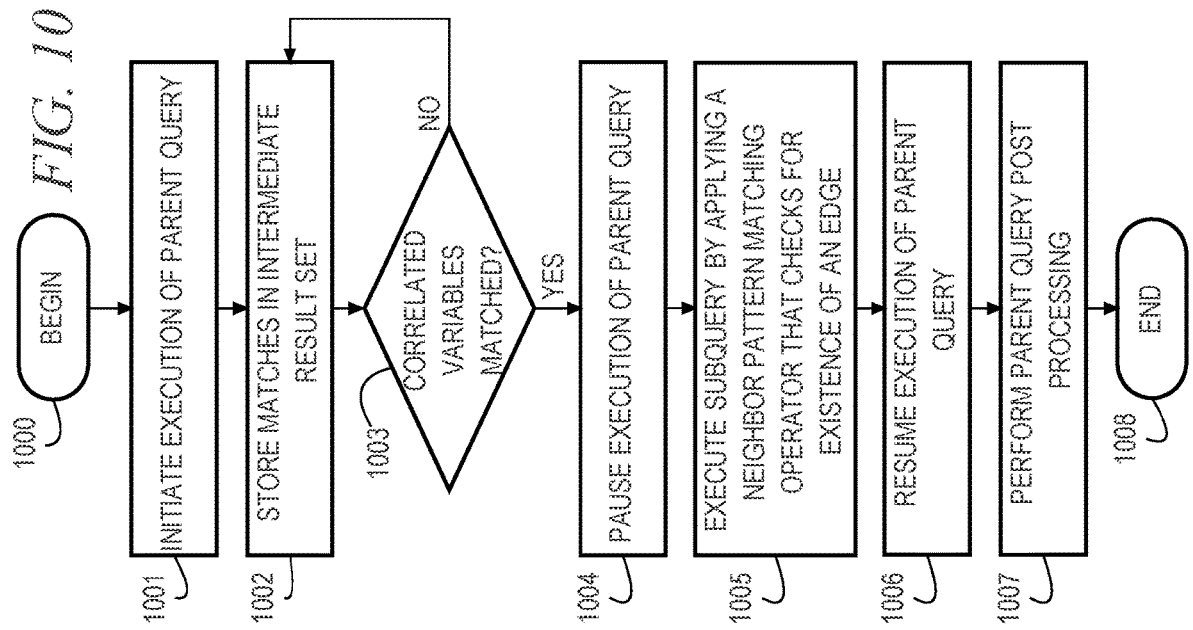
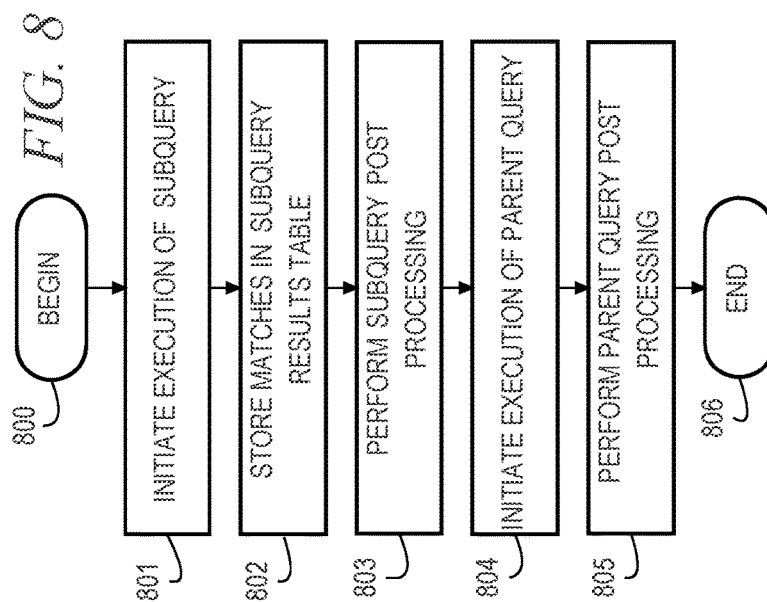

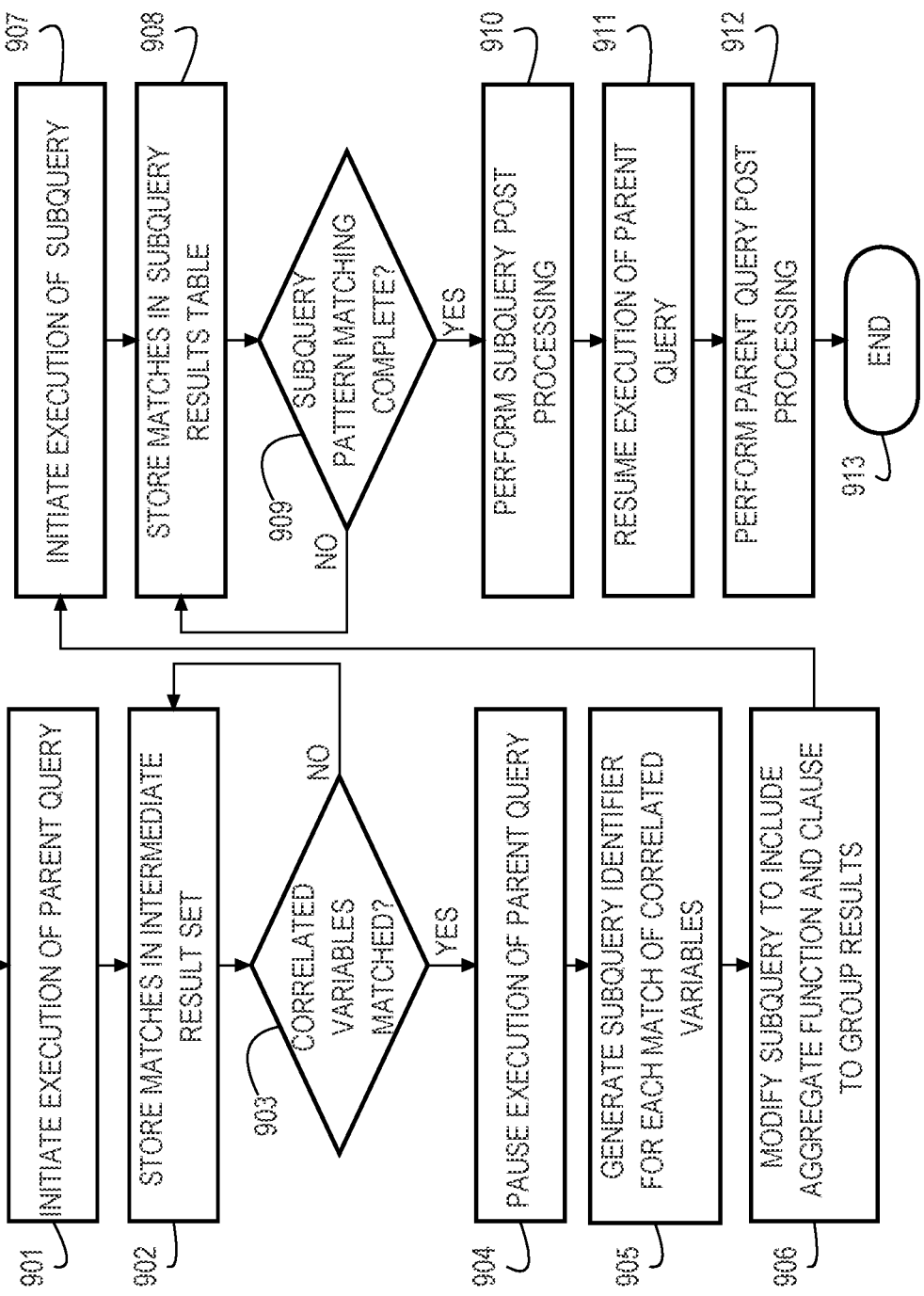

SUBQUERIES IN DISTRIBUTED ASYNCHRONOUS GRAPH QUERIES

RELATED APPLICATIONS

This application is related to U.S. application Ser. No. 17/080,698, titled "Efficient Compilation of Graph Queries on Top of SQL Based Relational Engine", filed Oct. 26, 2020, the entire contents of which are incorporated by reference as if fully set forth herein.

FIELD OF THE INVENTION

The present invention relates to querying graph database data and, more specifically, to executing subqueries in a distributed asynchronous graph queries.

BACKGROUND

Graph subqueries are queries that are nested inside another parent query. Graph subqueries are very important to any graph processing engine, allowing queries of complex patterns in a readable manner.

Subqueries can be complete queries, i.e., they include a pattern with filters, group by, order by, etc., and can occur in PATH, SELECT, FROM, WHERE, GROUP BY, HAVING, and ORDER BY clauses. For purposes of explanation, Property Graph Query Language (PGQL) is used as a reference graph query language throughout this disclosure. (Additional information about PGQL can be found in "PGQL: a Property Graph Query Language", by Oskar van Rest et al., GRADES 2016, Jun. 24, 2016, the entire contents of which is incorporated by reference as if fully set forth herein.) Other graph query languages can be used depending on the implementation. Subqueries can be scalar subqueries, which return a scalar value (exactly one row and one column), or existential subqueries, which return true/false depending on whether there is at least one result in the subquery.

Subqueries can also be differentiated into two types of subqueries: non-correlated and correlated. A non-correlated subquery is a subquery that can be run on its own without any dependence on the parent query. That is, a non-correlated subquery does not have any references to variables in the parent query. Table 1 shows an example of a query with a non-correlated subquery run on a distributed graph, such as the distributed graph shown in FIG. 1 for example.

TABLE 1

-- Get the persons with the maximum age
SELECT p
FROM MATCH (p:person)
WHERE p.age = ( SELECT MAX(m.age)
　FROM MATCH (m) )

In the above example, the subquery, "SELECT MAX (m.age) FROM MATCH (m)," references a variable m, which does not depend on the parent query.

A correlated subquery is a subquery that uses references to variables from the parent query, requiring the inner query to execute once for each parent query value (of the correlated variable(s)). Table 2 is an example of a query with a scalar correlated subquery.

TABLE 2

-- Get the persons that are older than the average age of their friends
SELECT a
FROM MATCH (a:person)
WHERE ( SELECT AVG(b.age)
　FROM MATCH (a:person)-[:friend]-(b:person) ) < a.age In the example shown in Table 2, the subquery, "SELECT AVG (b.age) FROM MATCH (a:person)-[: friend]-(b: person)," references variable a, which depends on the parent query. Furthermore, the subquery returns scalar variable that is the average of age properties of b vertices that match the query.

Table 3 is an example of a query with an existential correlated subquery.

TABLE 3

-- Get the persons that have at least 3 common friends but are not friends
to each other
SELECT a, c, COUNT(*) as num_common-friends
FROM MATCH (a:person)-[:friend]-(b:person)-[:friend]-(c:person)
WHERE NOT EXISTS ( SELECT * FROM MATCH (a:person)-[:friend]-(c:person) )
GROUP BY a, c
HAVING num_common_friends > 3
ORDER BY num_common_friends DESC In the example shown in Table 3, the subquery, "NOT EXISTS (SELECT*FROM MATCH (a: person)-[: friend]-(c: person))," references variables a and c, which depend on the parent query. Furthermore, the subquery returns a true/false value depending on whether there is at least one match of a person vertex a that is a friend edge to a person vertex c in the graph.

In a single-machine graph engine, a simple design for subqueries is for threads to execute a complete subquery when reaching a subquery in the execution tree. For instance, in the example query in Table 2, for every "a:person" vertex match, the execution can directly transition to executing the subquery. However, such an approach (i) cannot limit the memory consumption of the query, because any number of subqueries can execute at any time, and (ii) in distributed queries, at least one thread per machine must be involved to execute the query, resulting in a need for expensive coordination for every subquery instance. Controlling memory consumption of queries and subqueries is very important for graph processing, especially in distributed graphs that typically process large graphs and queries.

In a distributed system, neither of the two main approaches to graph traversals—breadth-first traversal (BFT) or depth-first traversal (DFT)—is particularly suitable to support subqueries. Consider the following PGQL query shown in Table 4 executed on a distributed graph.

TABLE 4

-- Searches for vertex a that has an outgoing edge to vertex b, with vertex b having at least one incoming edge
SELECT a
FROM MATCH (a)->(b)
WHERE EXISTS ( SELECT * FROM MATCH (b)<-(c) )

To execute the query, depth-first or breadth-first asynchronous graph traversals can be used.

DFT can be used to execute queries in distributed graphs while limiting memory consumption. This traversal requires the query to be expressed in a streamable manner to be able to reconstruct the correct result at the end. If the single machine solution is transposed in a distributed setting, the subquery execution would be inlined in the parent query execution. However, subqueries are complete queries, and in addition to pattern matching, GROUP BY and ORDER BY operations must be supported. Unfortunately, such operations are typically blocking, because they require communication from the machines to obtain the correct result. Hence, using a DFT is not a realistic solution as several subqueries would need to be active at a time, causing memory and performance problems.

Using a BFT approach would solve the issues associated with DFT, because communication can be added during the traversal without additional cost, allowing execution of any subqueries. This traversal implies computing all intermediate results at any stage. This is not scalable memory-wise due to path explosion. In addition, BFT still requires bootstrapping a subquery for each intermediate result. However, in a distributed setting, the cost of bootstrapping a query is high, so executing a subquery for each intermediate result is not scalable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a block diagram illustrating stages of execution for a query with a non-correlated subquery in accordance with an illustrative embodiment.

FIG. 4 is a block diagram illustrating stages of execution for a query with a correlated subquery in accordance with an illustrative embodiment.

FIG. 8 is a flowchart illustrating operation of a graph processing engine executing a query with a non-correlated subquery in accordance with an illustrative embodiment.

FIG. 9 is a flowchart illustrating operation of a graph processing engine executing a query with a correlated subquery in accordance with an illustrative embodiment.

FIG. 10 is a flowchart illustrating operation illustrating operation of a graph processing engine executing a query with an inlined subquery in accordance with an illustrative embodiment.

DETAILED DESCRIPTION

Figure 1:
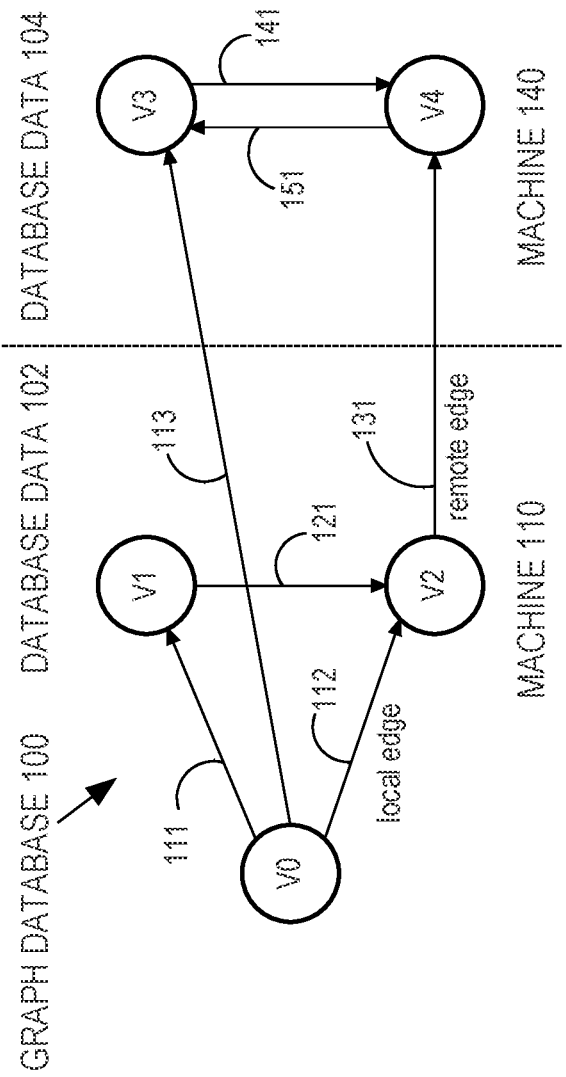
FIG. 1 depicts example graph data maintained by a distributed graph database management system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments implement efficient in-memory distributed subqueries that operate with limited memory consumption. The solution is designed on top of distributed asynchronous queries, which guarantee memory-bound distributed graph pattern matching. Adding efficient memory-bound subqueries on top of this asynchronous graph traversal comes with challenges. Due to the asynchronous runtime, every thread can operate in different parts of the query, thus subquery execution can be requested at any point by any thread. Asynchronous traversals execute pipelined pattern matching but do not implement the post-processing part of queries. Post-processing operators, such as GROUP BY and ORDER BY, are typically blocking and are executed after the pattern-matching phase is complete. As subqueries are complete queries, execution cannot transition from the parent query to the subquery in this pattern matching phase as adding blocking operation in an asynchronous execution would kill the benefits of asynchrony.

The illustrative embodiments provide solutions for graph processing systems with asynchronous distributed graph traversals; however, parts of this approach can be generalized for other distributed graph processing systems. With asynchronous distributed graph traversals, the graph processing systems execute in two phases: (i) the pattern matching phase that performs asynchronous graph traversals, and then (ii) the post-processing phase that computes blocking operations, such as GROUP BY and ORDER BY).

For non-correlated subqueries, their execution is done before the parent query. Such subqueries can be executed without information from the parent query, thus they can be executed before the parent query. The result is then collected and added to a result map. During the parent query execution, when a subquery is seen, the result is picked up from this map and the execution can continue. In the case of nested subqueries, the deepest subquery is executed first (i.e., depth-first execution of the query-subqueries tree).

For correlated subqueries, the query planner first identifies when the subquery can be started. As the correlated variables are the same in the parent query and the subquery, the subquery cannot start before all correlated variables have been instantiated. The execution starts with the parent query and performs asynchronous graph traversals up to the point that all correlated variables of the query have been matched and the subquery is ready to be executed. Once the parent query is paused, the subquery is executed and the result is collected in a result table, referred to as a "frame." The subquery execution happens in a batched manner. In other words, all instantiations of the correlated variables are executed in a single larger subquery in order to remove the per-variable distributed coordination costs and improve performance and scalability. The parent query is then resumed and uses the frame to retrieve the correct result and continues its execution until the end (or if there is another subquery).

In accordance with an illustrative embodiment, a graph processing engine executes a graph query with a parent query and a subquery nested within the parent query to enable fast, scalable, memory-controlled distributed graph subqueries. The graph processing engine of the illustrative embodiment provides graph query processing with subquery co-planning to remove the requirement to move data from one machine to another to feed the subquery execution. In one embodiment, the graph processing engine performs subquery batching by automatically added GROUP BY to enable the execution of a subquery as a single large query and to avoid the high overheads of coordinating and executing several smaller distributed queries. In an example embodiment, the graph processing engine performs micro batching on top of distributed asynchronous traversals to control the memory consumption of the query in the presence of subqueries. In one example embodiment, the graph processing engine performs inlining/flattening of pattern-only existential subqueries to enable zero-overhead subquery execution.

The solutions of the illustrative embodiments achieve fast and memory-limited distributed graph queries with subqueries. The illustrative embodiments achieve a balance between performance and memory control. Controlled batching allows the efficient execution of subqueries using asynchronous distributed traversals and enables limiting the overall memory consumption during execution. The illustrative embodiments extend the advantages of distributed asynchronous traversals to subqueries. In addition, for pattern-only existential subqueries that can be inlined, the graph processing engine of the example embodiments implements complete asynchronous distributed traversals.

Asynchronous Traversals for Distributed Graph Queries

FIG. 1 depicts example graph data maintained by a distributed graph database management system. Additional information about asynchronous traversals for distributed graph queries can be found in U.S. application Ser. No. 16/778,668, entitled "Dynamic Asynchronous Traversals for Distributed Graph Queries," filed Jan. 31, 2020, the entire contents of which is hereby incorporated by reference as if fully set forth herein. FIG. 1 depicts a five-vertex graph database 100 that is partitioned across a computing device 110 (which maintains database data 102) and a computing device 140 (which maintains database data 104). As referred to herein, a computing device "owns" data that is maintained by a database server instance running on the device. Thus, the vertices and edges defined in database data 102 are "owned" by computing device 110, and the vertices and edges defined in database data 104 are "owned" by computing device 140.

According to a non-limiting embodiment, an edge is owned by the machine that owns the source vertex of the edge. The owner of an edge maintains an identifier of a destination vertex of the edge, and an identifier of the owner of the destination vertex, as well as any properties of the edge. Thus, device 110 "owns" vertices v0, v1, and v2 and edges 111, 112, 113, 121, 131. Further, device 140 "owns" vertices v3 and v4 and edges 141, 151. "Reverse" edge information may also be maintained by the owner of the destination vertex of the edge, where the reverse edge information includes an identifier of the source vertex of the edge and an identifier of the owner of the source vertex.

With respect to the example data depicted in FIG. 1, matching (v0)→(v2) can happen locally at device 110 (i.e., matching local edge 112), while matching (v2)→(v4) requires remote communication between device 110 and device 140 (i.e., matching remote edge 131). Naturally, remote edges are more expensive to match than local edges because of inter-machine communication required to perform remote edge matching. Such communication subjects query execution to network latencies, which generally represent a bottleneck for query execution.

Figure 2:
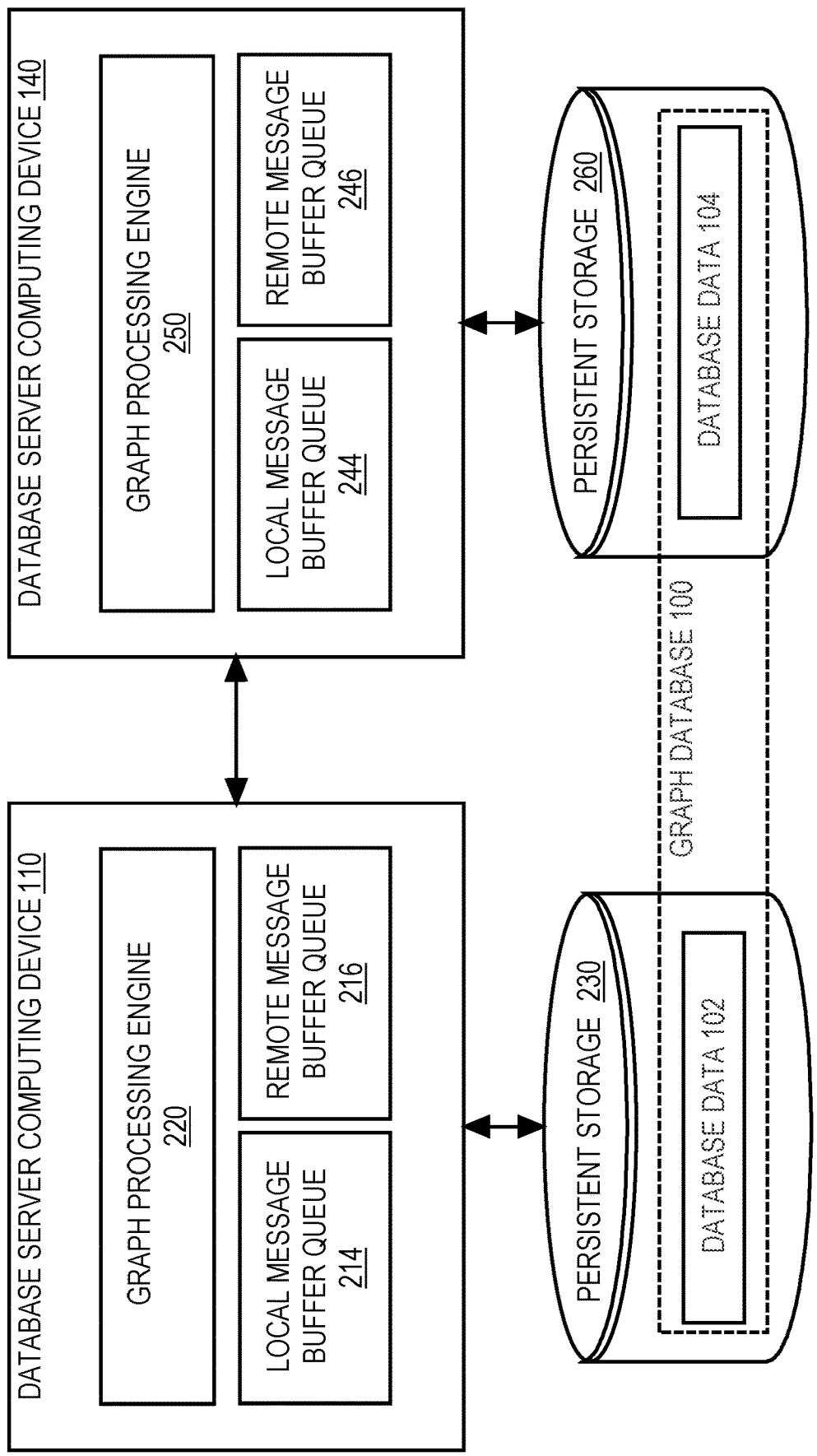
FIG. 2 is a block diagram that depicts an example arrangement for a distributed graph database management system.

Embodiments herein are described in the context of a distributed database system 200 comprising multiple database server instances that maintain database data on disks that are not shared among the multiple database server instances, as depicted in FIG. 2. Nevertheless, techniques described herein for dynamic traversal of graph data may be performed by any implementation of a database system, e.g., on a single-node database system that comprises a single database server instance, on a multi-node shared-memory database system that comprises multiple database server instances that access the same shared storage, on a multi-tenant database system comprising a single database server instance that serves multiple distinct databases, etc.

FIG. 2 depicts an example distributed database system 200 comprising a first graph processing engine 220 running on a first database server computing device 110, and a second graph processing engine 250 running on a second database server computing device 140. Graph processing engine 220 stores context information in local message buffer queue 214 and remote message buffer queue 216, and graph processing engine 250 stores context information in local message buffer queue 244 and remote message buffer queue 246.

Graph processing engines 220 and 250 maintain portions of a graph database 100, i.e., database data 102 maintained in persistent storage 230 by graph processing engine 220, and database data 104 maintained in persistent storage 260 by graph processing engine 250. Examples of graph database implementations include Spatial and Graph Analytics Oracle RDBMS, Big Data Appliance, and Oracle Graph Cloud Service. (More information regarding Spatial and Graph Analytics Oracle RDBMS may be found in "Spatial and Graph Analytics with Oracle Database 18c", an Oracle White Paper, February 4018, the entire contents of which are hereby incorporated as if fully set forth herein.)

Upon receiving a query, system 200 determines an execution plan for the query, where the execution plan contains a complete description of the query (i.e., which vertices to match, in which order, with what filters, and what output to produce). The plan includes "stages" and "hops," where a "stage" is responsible for matching exactly one vertex of the query path pattern. The information for a given stage also stores necessary information for matching and transitioning to any subsequent stage. The transitioning between stages happens via respective "hops." The purpose of a hop is to transfer context data from one stage to a subsequent stage of the query plan, which requires migration to a different machine if the information for a required edge or vertex in the graph data resides on a machine that is remote from the machine executing a present stage.

The query execution for distributed asynchronous traversals is split into two phases: the pattern matching phase and the post-processing phase. The pattern matching phase is an asynchronous graph traversal done using stages and hops. A stage represents the processing of a single vertex (i.e., matching the vertex depending on whether it satisfies possible filters in the query). During the execution of a query, stages advance sequentially, transitioning from a stage (a vertex) to the next stage (next vertex) via hop engines (the edge between vertices). Due to the asynchrony of this phase, any thread of any machine can be processing any stage during the lifetime of the execution. The second phase for post processing (e.g., ORDER BY) corresponds to operations that require bulk-synchronous execution. That is, every operation is composed of a local aggregation/computation followed by synchronization between the machines.

Thus, execution of a query against graph database 100 is split into one or more execution stages, e.g., by a query optimizer of system 200, where each stage of query execution comprises one of (a) exploration of a stage/hop in a path that is a potential solution for the query, or (b) processing of a final vertex in a path that is a potential solution for the query. The stages of query execution may be performed asynchronously and in parallel by multiple processing entities, e.g., multiple instances of a multi-node database system, multiple threads on a single-node database system, multiple threads running on multiple machines of a multi-node database system, etc. References to "processing entities" herein refer to threads and/or graph processing engines, depending upon implementation.

In the context of distributed system 200 depicted in FIG. 2, both machines initiate path exploration for a given query on every vertex that the machine owns, excluding any vertices that are determined to be filtered out by the query. At each stage of query execution, if property values of a given path do not match query requirements, the processing entity ceases exploration of the path and discards the path from the set of potential query solutions.

Graph processing engines 220, 250 buffer the local results in a local message buffer. According to an embodiment, once a local message buffer is full, the graph processing engine shares the message buffer with other processing entities of device 110, i.e., by including the message buffer in local message buffer queue 214. Performing BFT-based traversal until a threshold number of local intermediate results are stored in memory benefits locality and parallelization without escaping the target memory limits.

Graph processing engines 220, 250 cause results with remote edges to be included in one or more inter-machine message buffers. According to an embodiment, inter-machine message buffers are accumulated per target remote machine and are sent to the target machine once the buffers are full. After the inter-machine message buffer is full, engine 220 sends the inter-machine message buffer to device 140. According to an embodiment, system 200 implements flow control when sending inter-machine message buffers between machines of the system, which is described in further detail below.

According to an embodiment, inter-machine message buffers are pre-allocated and registered with a network interface controller (NIC) (not shown). A NIC is a computer hardware component that connects the device to a network that communicatively connects the device with other devices on the network. Once the inter-machine message buffer is received at the destination machine, the database server instance at the destination machine can use the intermediate results in the inter-machine message buffer to perform result computations.

Query Planning and Scheduling for Execution

Any graph processing engine that supports subqueries must (i) detect when a subquery can be executed during query planning and (ii) have a way to dispatch/schedule and execute the subquery.

Upon subquery detection, the query planner first checks the number of correlated variables to determine if the query is correlated or non-correlated (the planner creates a set of variables that are common between a given query and its parent query). If the common variable set is empty, then the subquery and the parent query are non-correlated, implying that the subquery can be executed on its own. Otherwise, if the common variable set is non-empty, then the subquery and the parent query are correlated. Intuitively, the correlated subquery can be executed once all correlated variables have been matched in the parent query. In the case of nested subqueries, each parent query must match the correlated variables from all of its subqueries.

The scheduling for execution of the subquery depends on the type of subquery: correlated or non-correlated.

Non-Correlated Subqueries

FIG. 3 is a block diagram illustrating stages of execution for a query with a non-correlated subquery in accordance with an illustrative embodiment. To support non-correlated subqueries, the flow of execution must first get the result of the subquery and then to execute the parent query.

The query planner creates a list of (sub)queries to execute. Non-correlated subqueries are executed first because they can be executed as standalone queries. In the case of nested subqueries, the planner recurses on them to take care of the deepest subqueries first. They are explored in a depth-first search (DFS) manner in the tree of subqueries. Once the deepest of the recursion has been reached, the query is run. As the subquery executes until it completes, the execution is the same as a single query without subqueries.

Subquery execution 310 starts with the subquery pattern matching phase 311. The graph processing engine then performs the subquery post-processing phase 312. After finishing execution of the subquery, a result collection phase 315 collects the results to be used in the parent query (or parent subquery in the case of nested subqueries). Parent query execution 320 starts with parent query pattern matching 321 and completes with the parent query post-processing phase 322. Parent query execution 320 can use the results collected by the result collection phase 315.

In one embodiment, the subquery produces an output frame containing the result of the subquery. Before parent query execution 320, the output frame result is added to a map of subquery results. This new map is used during parent query planning. If the planner encounters a subquery, the graph processing engine collects the result from the map and updates the filter with the correct value. This map is also used as a cache. Before building and executing a subquery, the planner checks that its key is not present in the map. If there exists an entry in the map, it implies that the query has already been executed, and the existing result can be used instead of running the same query twice.

In order to give access to the results on all machines, the result frame is replicated on all machines. This has small memory overhead, because scalar subqueries produce only a single row/value and existential subqueries produce only a Boolean value indicating whether a result is found. Some existential subqueries can return large results, and these results are produced and stored by the graph processing engine; however, during the result collection phase, the results are reduced to a simple existential Boolean value, so they occupy minimal memory. In addition, once the output frame result has been added to the map, the frame is deleted.

Given the nature of existential subqueries and the asynchronous distributed traversals, for pattern-only queries the asynchronous engine can be tuned to stop the query execution as soon as the first result is emitted, since this guarantees that the existential subquery already returns true.

Correlated Subqueries

FIG. 4 is a block diagram illustrating stages of execution for a query with a correlated subquery in accordance with an illustrative embodiment. To support correlated subqueries, the graph processing engine modifies distributed asynchronous traversals. In response to all correlated variables being matched in the parent query pattern matching phase 401, the graph processing engine pauses the parent query pattern matching phase 401 to start the subquery pattern matching phase 411. At the end of the subquery pattern matching phase 411, the subquery post-processing phase 412 is executed to collect all subquery results into output frame 415, which is then used by the parent query.

In response to the subquery execution completing, the parent query pattern matching phase 402 is resumed and finished using the subquery results in output frame 415. The parent query finishes by executing the post-processing phase 403 and collecting results into output frame 405. The parent query pattern matching phase 402, parent query post-processing phase 403, and output frame 405 can use results stored in the output frame 415 generated by the subquery.

Figure 5:
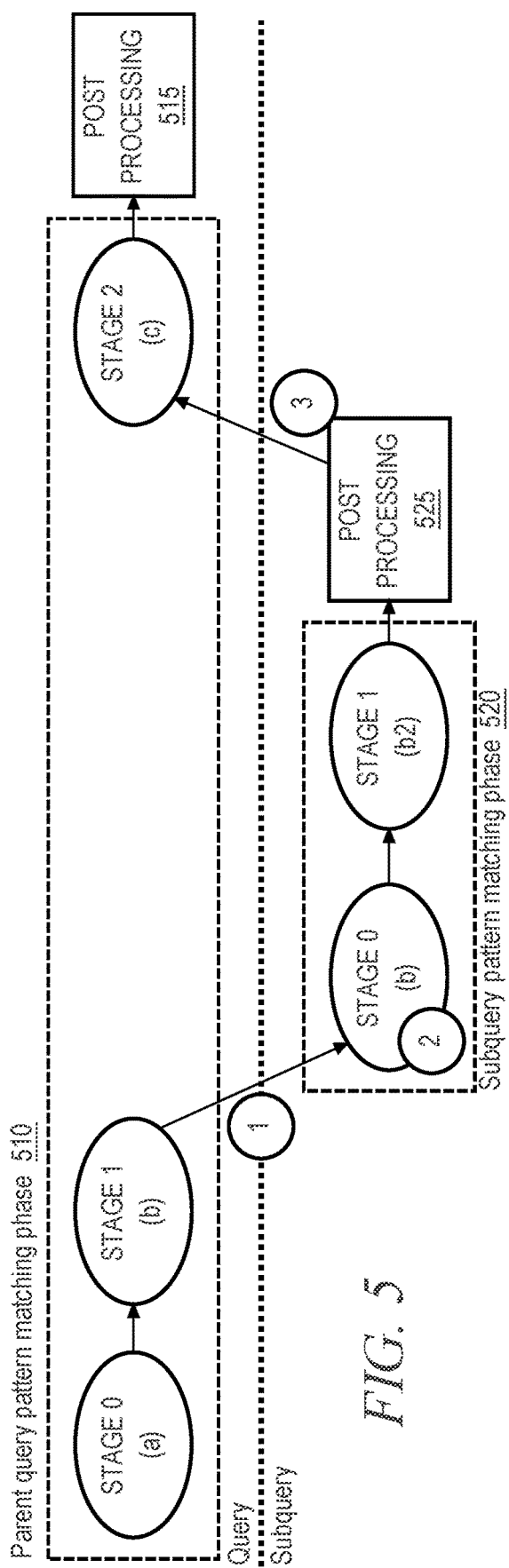
FIG. 5 illustrates an example execution of a query with a correlated subquery in accordance with an illustrative embodiment.

FIG. 5 illustrates an example execution of a query with a correlated subquery in accordance with an illustrative embodiment. Consider the following query with a correlated subquery shown in Table 5 executed on a distributed graph.

TABLE 5

-- the subquery cannot execute before (b) is matched in the parent query
SELECT COUNT(*)
FROM MATCH (a)-[:friend]-(b)-[:friend]-(c)
WHERE EXISTS (SELECT *
  FROM MATCH (b)-[:friend]-(b2:person)
  WHERE b2.age > a.age)

In the example shown in Table 5, the subquery, "EXISTS (SELECT*FROM MATCH (b)-[: friend]-(b2:person) WHERE b2.age>a.age)," references variables a and b, which depend on the parent query. Furthermore, the subquery returns a true/false value depending on whether there is at least one match of a person vertex b that has a friend edge to a person vertex b2 in the graph where the age of the person vertex b2 is greater than the age of the vertex a.

Although the idea seems straightforward, there are three key challenges to make the solution work efficiently (indicated with the numbers (1) to (3) in FIG. 5):

(1) Starting the subquery using information from the parent query and controlling the memory usage (see the "Subquery Planning" and "Starting the Subquery" sections below).

(2) Bootstrapping the subquery execution in a scalable manner (see the "Batching Subquery Executions" section below).

(3) Collecting the results and making them available to the parent query (see the "Collecting Results in the Parent Query" section below).

In addition, for certain pattern-only existential subqueries, the graph processing engine can optimize processing further by inlining the pattern (see the "Inlining the Subquery" section below).

Subquery Planning

The query planner must determine when the subquery can be executed. The subquery cannot be executed at any moment because some variables in the subquery are the same as variables in the parent query (correlated variables). When planning the graph traversal using stages, if all correlated variables have been matched (i.e., the set of already seen vertex symbols up until the current stage and the set of correlated variables are equal), then the subquery can be safely executed, and a flag is set to the current stage to indicate that the parent execution should be paused. Thus, the parent query pattern matching phase 510 starts by matching the correlated variables in stage 0 (matching the vertex a) and stage 1 (matching the vertex b) at which point all correlated variables have been matched. Correlated variables are retrieved from the correlated vertices or correlated edges. If there are nested subqueries (i.e., a subquery inside a subquery), correlated variables of both subqueries must be matched to enable execution of the outermost query. To correctly determine the set of correlated variables, correlated variables with value only should be detected and included in the set as well. Note that if the subquery has no correlated variables detected (i.e., it is a non-correlated query), it is run before the other queries.

The query planner also needs to set the stages for the subquery differently than for the parent query. In the parent query, the goal is to limit the number of patterns to traverse by putting variables with the lowest selectivity in earlier stages. However, this approach is not ideal for subqueries. In the example shown in Table 5, if the parent query stops execution at b, and the subquery starts at b2, b and b2 might not be on the same machine. As a result, communication is needed to bring information from the machine that owns b to the machine that owns b2, which can be computationally expensive. The query plan for the subquery is changed to start from the correlated variable that does not create shuffling. Here, the parent query stops at b, and the subquery also starts subquery pattern matching phase 520 at b in stage 0 and executes pattern matching of b2 in stage 1. As a result, when the query planner sets the stage for the subquery, the starting variable must be the last visited variable by the parent query.

Starting the Subquery

When switching from a parent query to the subquery, intermediate results must be passed from one processing entity to another. In asynchronous distributed traversals, a message sent to a remote machine contains context that has information about previous pattern matching steps to continue execution on the current machine at a given stage without any additional communication. This idea is leveraged for passing intermediate results from a query to its subquery. A subquery context queue is added to the graph processing engine to store the messages when reaching the last stage of the parent queue before the subquery and to trigger computation in the first stage of the subquery. Each stage has an input context (variables required to run the stage) and an output context (variables required to run the next stage). From its input context, a stage can remove variables that are not needed anymore (used only in the stage filters) or add some variables (used in later stages). Assume a user wants to query the name of every person that is connected to someone of the same height. The context must include the name of the person (to display at the end), the height of the person (to do the comparison, will be removed from the context after comparison), and the person vertex.

From the two contexts (of the parent query and the subquery), one big context is created by merging the two contexts together to erase context passing from one machine to another. In an alternative implementation, the graph processing engine could keep the contexts separate with the cost of copying data from one context to the other. This context will then have all the necessary information to run the subquery: correlated variables that have already been matched by the parent query and variables used by the subquery. As an optimization, useless variables in the context are pruned to make the engine more memory efficient. Hence, a machine that receives this merged context will be able to continue the execution without requiring extra communication. In addition to the existing variables, one new column is added to the context to store a unique subquery identifier (suid). The suid is globally unique to a correlated variable instantiation and will be used at the end of the subquery execution. It is constructed using a <machine_id, local_idx>pair. This pair is unique across the whole distributed system.

To determine whether the current query needs to stop its execution, the graph processing engine checks the flag of the current stage during execution. If the flag is set, then the engine stops creating new computations to pause the current execution and to fill a context queue. If no computation is triggered, then the stage will finish eventually, following the existing stage termination protocol. The context queue contains many contexts used to trigger new computation. As contexts are collected at the end of a stage (or upon message reception), the queue created per machine will contain only contexts that trigger local computation. One context represents an instantiation of correlated variables pattern-matched during the parent query execution. As mentioned above, each context contains all necessary information for the subquery to be run without additional communications. Once the parent query execution is paused, the subquery execution is started from this context queue.

Stopping the parent query pattern matching without completing the whole pattern results in materializing all intermediate result contexts. This leads to a potential high-memory consumption for intermediate results and goes against the goal of controlled memory consumption. Thus, instead of producing all the intermediate results before subquery execution, the graph processing engine keeps the subquery context queue bounded to control the memory consumption of the execution. The queue can have a fixed/bounded size, and the query execution continues until the whole query is completed.

Batching Subquery Executions

Figure 6:
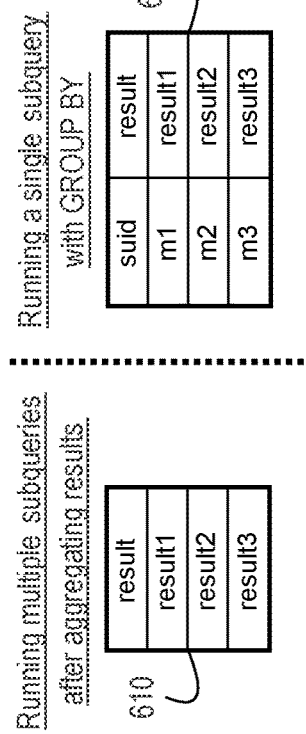
FIG. 6 illustrates an example output frame running multiple subqueries and an example output frame running a single subquery grouped by correlated variables in accordance with an illustrative embodiment.

Running a separate subquery for every intermediate result (i.e., context) would not be a viable solution in terms of performance. Query bootstrapping takes at least a few milliseconds in a typical distributed system, hence even a query that has only a thousand intermediate results to be fed in subqueries would take several seconds to execute. As a result, the subquery is adapted before being executed. FIG. 6 illustrates an example output frame running multiple subqueries and an example output frame running a single subquery grouped by correlated variables in accordance with an illustrative embodiment. Based on the query shown in Table 5 above, running multiple subqueries results in output frame 610. Subquery execution from correlated variables a1, b1 produces result1. Subquery execution from correlated variables a2, b2 produces result2. Subquery execution from correlated variables a3, b3 produces result3.

Table 6 shows the subquery of Table 5 rewritten to execute a single subquery grouped by correlated variables using the GROUP BY operation.

TABLE 6

SELECT suid, COUNT(*)
FROM MATCH (b)-[:friend]-(b2:person)
WHERE b2.age > a.age
GROUP BY suid The subquery post-processing phase 525 running the single subquery grouped by correlated variables results in output frame 620, which includes result1, result2, and result3 grouped by suid of the correlated variable instances. Thus, instead of running one query per correlated variable instance (i.e., a subquery que entry), all results are computed at once by adding a GROUP BY operation on the subquery. Each row in the output frame of this new subquery corresponds to the result for a given correlated variable instance, identified by the suid. This observation can be extended to any number of subquery matches, any number of correlated variables, and any subquery. Computing the result for each correlated variable is semantically equivalent to computing the global result of the subquery while grouping by the suid.

This new subquery containing all the original subquery results allows execution of a single subquery instead of one subquery per intermediate result. The output frame 620 of this new subquery contains the subquery results of all intermediate results. Each row of the frame corresponds to the result of a subquery execution started by a context. As mentioned above, each context has a suid assigned to it. This suid is used to make the mapping between a row of the output frame and the context that produced it. Thus, instead of grouping by correlated variables, grouping by suid allows easier mapping at the end of the subquery execution. It is equivalent to grouping by correlated variables as each correlated variable instantiation is mapped to a single suid.

The projection part of the subqueries is adapted based on the query type (existential or scalar). If the subquery is existential, then the result will depend on whether the subquery produces at least one result. The subquery is thus modified by adding the suid in the projection phase and aggregation is also to the initial projections to keep the query valid. Any aggregation can be added to column projections, COUNT( ) is needed for * projection.

Table 7 shows a rewritten existential subquery for the query shown in Table 3 above.

TABLE 7

SELECT suid, COUNT(*)
FROM MATCH (a:person-[:friend]-(c:person)
GROUP BY suid

This new subquery will give a result for every existing correlated variable instance. Each row indicates a non-null result is obtained when the subquery is executed from the variable instantiation of a given context. Contexts producing a null result (i.e., zero results) will be filtered out during the subquery execution. This implies that every row present in the output frame verifies the EXIST condition, and the missing row verifies the NOT EXISTS condition.

Scalar subqueries return a single value. The added GROUP BY operation should return exactly one result per intermediate result (and throw an error if it is not the case).

Scalar subqueries with and without global aggregation (each subquery result from a context has been aggregated) must be handled differently.

With global aggregation, from a single context, new intermediate results can be generated. As the projection has only aggregations, all those intermediate results will produce a single result (from a context, the subquery will produce one row). For the subquery to be valid, every context must produce an output (i.e., a row in the output frame). The validity can be checked at the end of the subquery execution by comparing the total number of contexts to the size of the subquery output frame, which can be done by comparing locally the size of the local queue to the size of the received frame during the GROUP BY operation or in the parent query when resuming computation. If a context is not mapped to a row, it means that its subquery has not produced a result.

Table 8 shows a rewritten scalar subquery and the possible output frame for the query shown in Table 2 above.

TABLE 8

-- new subquery
SELECT suid, AVG(b.age)
FROM MATCH (a:person)-[:friend]-(b:person)
GROUP BY suid

| -- possible output frame for X contexts | |
| --- | --- |
| suid | AVG(m.age) |
| c1 | 27 |
| c2 | 23 |
| ... | ... |
| cX | 28 |

If a scalar subquery has no aggregation, it implies that each context should produce a single result. If a context produces two or more rows, the subquery is not valid. As a GROUP BY operation is to the subquery, its filters need to have an aggregation to keep the subquery valid from a PGQL point of view. However, adding such aggregation prevents detecting whether a context produces multiple results as they will be aggregated in the output frame. To solve this issue, a COUNT(*) is added to the projection. As a result, if the value of COUNT(*) is greater than 1 for a row, then the subquery is invalid.

Table 9 shows the example from Table 2 without aggregation.

TABLE 9

-- Get the persons that are older than their friends
SELECT a
FROM MATCH (a:person)
WHERE ( SELECT b.age
    FROM MATCH (a:person)-[:friend]-(b:person) ) < a.age Table 10 shows a rewritten scalar subquery and the possible output frame for the query shown in Table 9 above.

TABLE 10

-- new subquery
SELECT suid, MAX(b.age), COUNT(*)
FROM MATCH (a:person)-[:friend]-(b:person)
GROUP BY suid TABLE 10-continued

| -- possible output frame for X contexts | | |
| --- | --- | --- |
| suid | MAX(m.age) | COUNT(*) |
| c1 | 24 | 1 |
| c2 | 28 | 2 |
| c3 | 27 | 1 |
| c4 | 20 | 1 |
| ... | ... | ... |
| cX | 23 | 1 |

As seen in Table 10, the entry for c2 is invalid because the number of results is greater than 1 for a scalar query, which should return a single value. In this example, both the aggregation and the COUNT(*) are required to ensure the correctness of the execution.

The aggregation is required, because b.age is not a GROUP BY key. The aggregation solves this by providing a single result per suid to have a correct subquery. Any aggregation is the same in this example, because MIN, MAX, and AVG yield the same result for a single match (COUNT(*)=1). Thus, for one suid, the result of the subquery is NULL if COUNT returns 0, the result of the subquery is the actual result of the aggregation if COUNT returns 1, and the result of the subquery is an error (invalid) if COUNT returns more than 1.

Collecting Results in the Parent Query

To resume the parent query at stage 2 in the parent query pattern matching phase 510 and in post-processing phase 515, each machine will iterate over its local context queue. Because frames are distributed, each machine has a subset of the global frame, hence a subset of the subquery results. As a result, any post-processing operation should use the machine_id from the suid to send the subquery result to the machine that created the context to perform aggregation. In the case of a GROUP BY operation, each machine applies a local grouping first. To make the global grouping, each machine then sends the local key/value pair to a given machine, which is initially selected using a hashing function. Therefore, each machine is responsible for a set of keys. For each context, the collected subquery instance should be located at the machine that created the context otherwise some shuffling is necessary. Instead of using this hashing function that sends the keys to a random machine, the suid will be used (the machine_id part as mentioned before) to send the key/value pair directly to the machine that created the context. One step of reshuffling is avoided using this optimization.

In the parent query, the result is picked up from the frame and used to update the parent query where it is needed. For WHERE subqueries, the corresponding filter (set as a variable at the beginning) is updated. If the subquery is an EXISTS/NOT EXISTS, it checks the presence of the suid in the frame, and if it is a scalar subquery, it retrieves the value of the result column in the output frame. After updating the filter, the context is used to trigger new computation, similarly to the subquery. For SELECT subqueries, the corresponding result is added in the output frame for each row. For GROUP BY, ORDER BY, and HAVING subqueries, which use the output frame to gather the necessary data to perform the clause, the subquery result is extracted from the subquery output frame when necessary. The execution continues until either the query finishes, or there is another subquery that requires switching again. Indeed, if the parent query contains multiple non-nested subqueries, it will be detected at query parsing time, which implies that the contexts and the stages are adapted to support both subqueries. The context contains correlated variables from both subqueries, and the parent query pauses at two different stages.

Inlining the Subquery

As described above, any subquery with a post-processing phase should use solutions described above because the post-processing phase should not be added in an asynchronous part. However, some existential subqueries either do not have any post-processing phase or can be rewritten to avoid a post-processing phase. This implies that certain subqueries can be executed within the pattern matching phase of the parent query. As a result, an optimization can be implemented for a certain type of subqueries.

Figure 7:
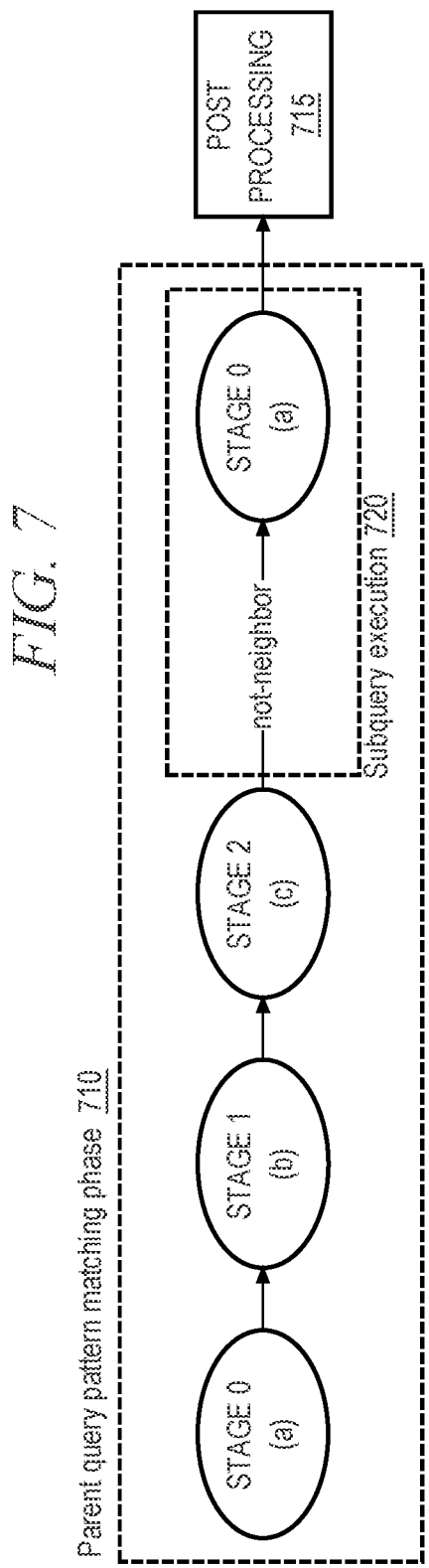
FIG. 7 illustrates an example execution of a query with a an inlined subquery in accordance with an illustrative embodiment.

Table 3 above illustrates a simple correlated subquery with an existential subquery and no post-processing phase. FIG. 7 illustrates an example execution of a query with an inlined subquery in accordance with an illustrative embodiment. In this example, the execution of the subquery is integrated into the parent query pattern matching phase 710. The correlated variables a and c must be matched to start the subquery; therefore, the first three stages of the parent query match variables a, b, and c. Like non-inlined correlated subqueries, execution of the subquery starts with the same variable c that the parent query stopped with in stage 2. As the subquery is fully integrated into the parent query pattern matching, this variable c is visited only once. For the NOT EXISTS subquery example, the subquery execution 720 introduces a new "not-neighbor" matching operator that checks in the neighbor list of c that a is not a neighbor (with the "friend" filter in the example shown in Table 3). The intuition behind this optimization is that the not-neighbor operator can be deterministically invoked exactly once for each subquery instantiation to decide whether the existential filter is satisfied or not. Then, the post-processing phase 715 generates results for the query.

Accordingly, this optimization cannot be used on all queries. The conditions for inlining are as follows:
1. As the subquery is inlined in the parent query pattern matching, the subquery should not have any post-processing phase, nor contain any global aggregation operations (e.g., MAX, AVG). Global aggregations require execution with per-subquery instance grouping, not fitting asynchronous DFT traversals. Thus, this optimization is limited to existential subqueries.
2. The subquery has at most a single non-correlated variable. Having more than one variable means that the pattern might need to be expanded across machines, not allowing to have exactly one invocation per subquery instantiation.
3. The subquery does not include any filters on this non-correlated variable. Otherwise, as above, the existential condition cannot be checked exactly once, as the pattern might lead the execution to a remote machine.

Although the inlining optimization is applicable to specific types of existential subqueries, it does not capture an important group of subqueries commonly used in practice.

Procedural Over View

FIG. 8 is a flowchart illustrating operation of a graph processing engine executing a query with a non-correlated subquery in accordance with an illustrative embodiment. Operation begins (block 800), and the graph processing engine initiates execution of the subquery (block 801) and stores matches in a subquery results table (block 802). The graph processing engine performs subquery post processing (block 803). The graph processing engine then initiates execution of the parent query (block 804) and performs parent query post processing (block 805). Thereafter, operation ends (block 806).

FIG. 9 is a flowchart illustrating operation of a graph processing engine executing a query with a correlated subquery in accordance with an illustrative embodiment. Operation begins (block 900), and the graph processing engine initiates execution of the parent query (block 901) and stores matches in the intermediate result set (block 902). The graph processing engine determines whether all correlated variables have been matched (block 903). If not all correlated variables have been matched (block 903: NO), then the graph processing engine continues execution of the parent query pattern matching phase, and operation returns to block 902 to store matches in the intermediate result set.

If all correlated variables have been matched (block 903: YES), then the graph processing engine pauses execution of the parent query (block 904). The graph processing engine generates a subquery identifier (suid) for each match of correlated variables (block 905). The graph processing engine modifies the subquery to include an aggregate function and a clause to group results by suid (block 906).

The graph processing engine initiates execution of the subquery (block 907) and stores matches in a subquery results table (block 908). The graph processing engine determines whether subquery pattern matching is complete (block 909). If subquery pattern matching is not complete (block 909: NO), then the graph processing engine continues execution of the subquery pattern matching phase, and operation returns to block 908 to store matches in the subquery results table. If subquery pattern matching is complete (block 909: YES), then the graph processing engine performs subquery post processing (block 910).

The graph processing engine then resumes execution of the parent query (block 911) and performs parent query post processing (block 912). Thereafter, operation ends (block 913).

FIG. 10 is a flowchart illustrating operation illustrating operation of a graph processing engine executing a query with an inlined subquery in accordance with an illustrative embodiment. Operation begins (block 1000), and the graph processing engine initiates execution of the parent query (block 1001) and stores matches in an intermediate result set (block 1002). In one embodiment, the pattern matching phase of the parent query is executed such that the pattern matching phase is paused at the same variable that begins pattern matching in the subquery. The graph processing engine determines whether all correlated variables are matched (block 1003). If not all correlated variables have been matched (block 1003: NO), then the graph processing engine continues execution of the pattern matching phase of the parent query, and operation returns to block 1002 to store matches in the intermediate result set.

If all correlated variables have been matched (block 1003: YES), then the graph processing engine pauses execution of the parent query (block 1004) and executes the subquery by applying a neighbor pattern matching operator (neighbor or not-neighbor) that checks for existence of an edge (block 1005). The graph processing engine then resumes execution of the parent query (block 1006) and performs parent query post processing (block 1007). Thereafter, operation ends (block 1008).

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
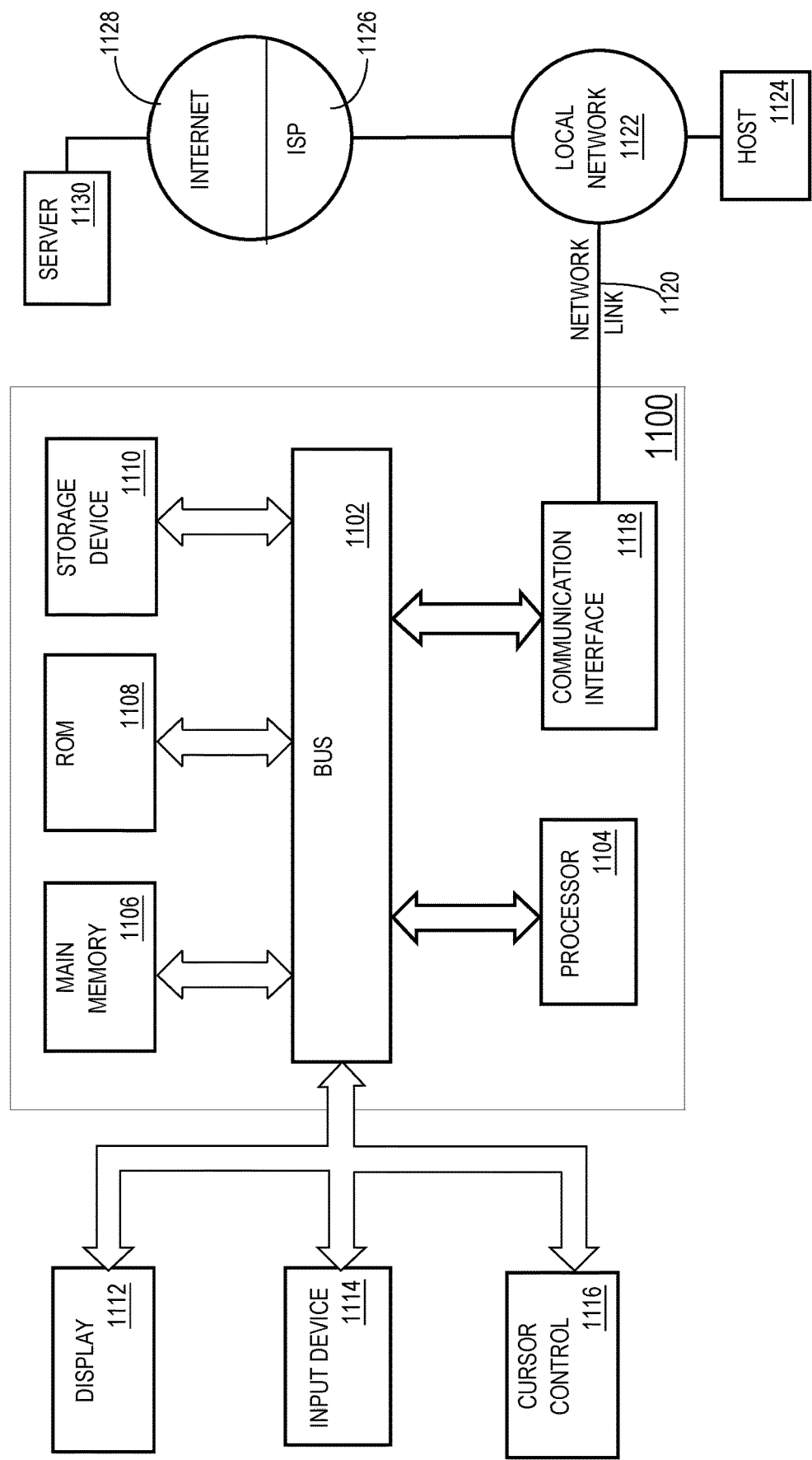
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world-wide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 12:
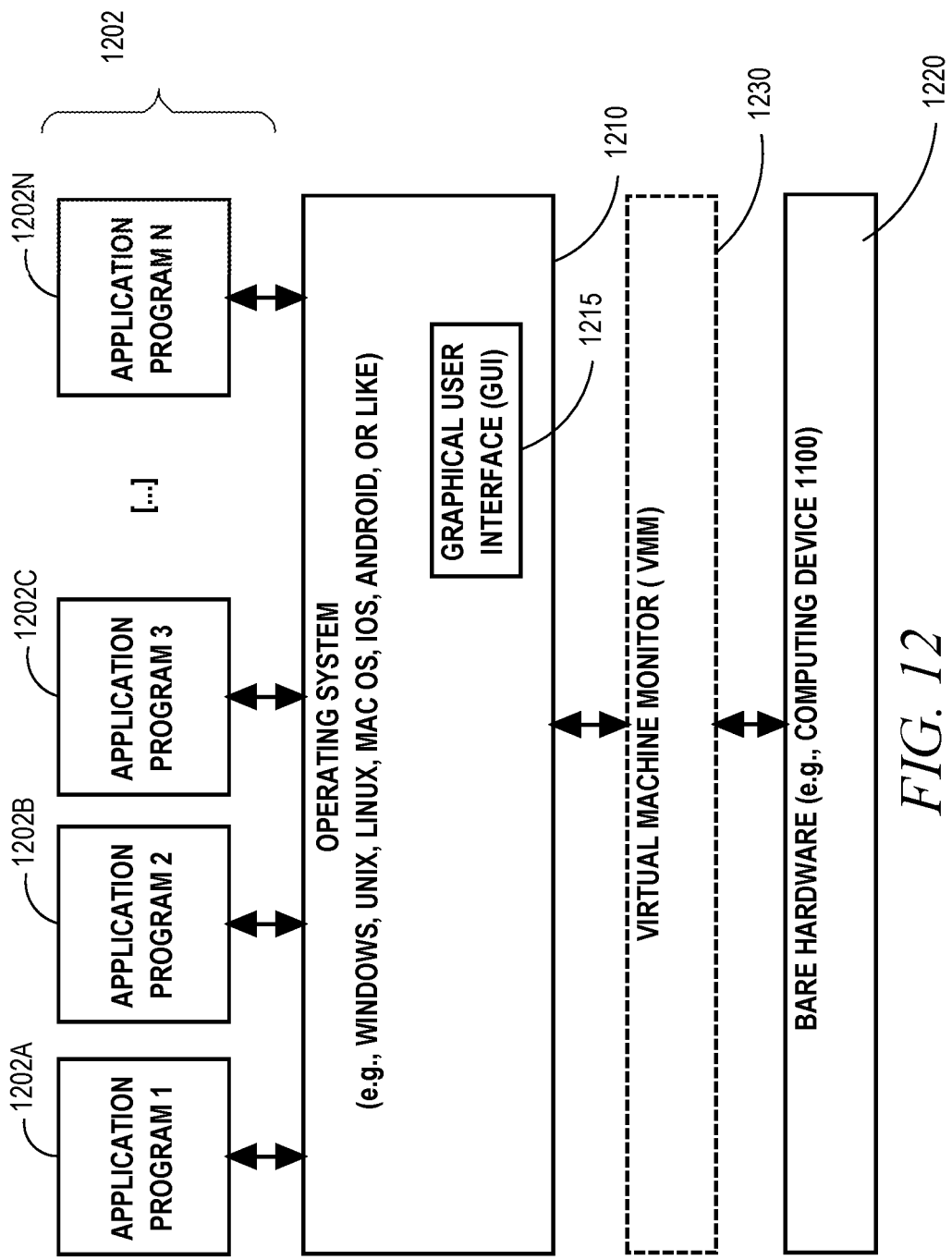
FIG. 12 is a block diagram of a basic software system that may be employed for controlling the operation of a computer system upon which an embodiment of the invention may be implemented.

FIG. 12 is a block diagram of a basic software system 1200 that may be employed for controlling the operation of computer system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computer system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   a graph processing engine executing a graph query, wherein:
   the graph query comprises a parent query and a subquery nested within the parent query;
   the subquery uses a reference to one or more correlated variables from the parent query;
   executing the graph query comprises:
   initiating execution of the parent query;
   responsive to the parent query matching the one or more correlated variables in an intermediate result set, pausing the execution of the parent query;
   generating a subquery identifier for each match of the one or more correlated variables;
   modifying the subquery to include a subquery aggregate function and a clause to group results by subquery identifier;
   responsive to pausing execution of the parent query, executing the modified subquery using the intermediate result set and collecting subquery results into a subquery results table; and
   resuming execution of the parent query using the subquery results table.

2. The method of claim 1, wherein:
   the subquery is an existential subquery returning a Boolean value that depends on whether the subquery produces at least one match result;
   the subquery aggregate function counts a number of matches for each subquery identifier; and
   the subquery results table includes an entry for each subquery identifier having at least one match, the entry indicating a number of matches; and
   the subquery determines the Boolean value based on whether a given subquery identifier has an entry in the subquery results table.

3. The method of claim 1, wherein:
   the subquery is a scalar subquery returning a single value;
   the subquery does not include an aggregate function; and
   the subquery aggregate function produces the single value for each subquery identifier; and
   the subquery results table includes an entry for each subquery identifier having at least one match, the entry indicating the corresponding single value.

4. The method of claim 1, wherein executing the graph query comprises executing the modified subquery using asynchronous distributed graph traversals.

5. The method of claim 4, wherein executing the modified subquery comprises performing pattern matching in a pattern matching phase using asynchronous distributed graph traversals and performing aggregation and grouping in a post-processing phase.

6. The method of claim 1, wherein initiating execution of the parent query comprises initiating asynchronous graph traversals in a first pattern matching phase of the parent query.

7. The method of claim 6, wherein resuming execution of the parent query comprises resuming asynchronous graph traversals in a second pattern matching phase of the parent query.

8. The method of claim 6, wherein resuming execution of the parent query comprises initiating execution of operations that require bulk-synchronous execution in a post-processing phase of the parent query.

9. The method of claim 1, wherein executing the subquery comprises initiating execution of the subquery at a last variable, of the one or more correlated variables, visited by the parent query.

10. The method of claim 1, wherein the execution of the parent query comprises storing the intermediate result set in a memory-bounded subquery context queue to pass the intermediate result set to the subquery.

11. The method of claim 1, wherein the subquery identifier comprises a machine identifier, local identifier pair.

12. The method of claim 1, wherein the graph query is a subquery of another graph query.

13. The method of claim 1, further comprising:
   the graph processing engine executing a second graph query, wherein:
   the second graph query comprises a second parent query and a second subquery nested within the parent query;
   the second subquery uses no references to variables from the second parent query;
   executing the graph query comprises:
   performing a subquery pattern matching phase of the second subquery;
   performing operations that require bulk-synchronous execution in a post-processing phase of the second subquery;
   responsive to completing execution of the second subquery, collecting results in a second subquery results table; and
   initiating execution of the parent query using the subquery results table.

14. The method of claim 13, wherein initiating execution of the second parent query comprises initiating asynchronous graph traversals in a pattern matching phase of the second parent query and initiating execution of operations that require bulk-synchronous execution in a post-processing phase of the second parent query.

15. One or more non-transitory storage media storing instructions which, when executed by one or more computing devices, cause performance of a method comprising:
 a graph processing engine executing a graph query, wherein:
  the graph query comprises a parent query and a subquery nested within the parent query;
  the subquery uses a reference to one or more correlated variables from the parent query;
  executing the graph query comprises:
   initiating execution of the parent query;
   responsive to the parent query matching the one or more correlated variables in an intermediate result set, pausing the execution of the parent query;
   generating a subquery identifier for each match of the one or more correlated variables;
   modifying the subquery to include a subquery aggregate function and a clause to group results by subquery identifier;
   responsive to pausing execution of the parent query, executing the modified subquery using the intermediate result set and collecting subquery results into a subquery results table; and
   resuming execution of the parent query using the subquery results table.

16. The one or more non-transitory storage media of claim 15, wherein:
 the subquery is an existential subquery returning a Boolean value that depends on whether the subquery produces at least one match result;
 the subquery aggregate function counts a number of matches for each subquery identifier; and
 the subquery results table includes an entry for each subquery identifier having at least one match, the entry indicating a number of matches; and
 the subquery determines the Boolean value based on whether a given subquery identifier has an entry in the subquery results table.

17. The one or more non-transitory storage media of claim 15, wherein:
 the subquery is a scalar subquery returning a single value;
 the subquery does not include an aggregate function; and
 the subquery aggregate function produces the single value for each subquery identifier; and
 the subquery results table includes an entry for each subquery identifier having at least one match, the entry indicating the corresponding single value.

18. The one or more non-transitory storage media of claim 15, wherein executing the graph query comprises executing the modified subquery using asynchronous distributed graph traversals.

19. The one or more non-transitory storage media of claim 15, wherein the subquery identifier comprises a machine identifier, local identifier pair.

20. The one or more non-transitory storage media of claim 15, the method further comprising:
 the graph processing engine executing a second graph query, wherein:
  the second graph query comprises a second parent query and a second subquery nested within the parent query;
  the second subquery uses no references to variables from the second parent query;
  executing the graph query comprises:
   performing a subquery pattern matching phase of the second subquery;
   performing operations that require bulk-synchronous execution in a post-processing phase of the second subquery;
   responsive to completing execution of the second subquery, collecting results in a second subquery results table; and
   initiating execution of the parent query using the subquery results table.

* * * * *